(12) United States Patent
Burd et al.

(10) Patent No.: US 9,945,236 B2
(45) Date of Patent: Apr. 17, 2018

(54) GAS TURBINE HUB

(71) Applicant: United Technologies Corporation, Hartford, CT (US)

(72) Inventors: Steven W. Burd, Cheshire, CT (US); Meggan Harris, Colchester, CT (US); John T. Ols, Northborough, MA (US); William G. Askey, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 184 days.

(21) Appl. No.: 14/893,229

(22) PCT Filed: May 22, 2014

(86) PCT No.: PCT/US2014/039091
§ 371 (c)(1),
(2) Date: Nov. 23, 2015

(87) PCT Pub. No.: WO2015/020715
PCT Pub. Date: Feb. 12, 2015

(65) Prior Publication Data
US 2016/0108745 A1    Apr. 21, 2016

Related U.S. Application Data

(60) Provisional application No. 61/835,871, filed on Jun. 17, 2013.

(51) Int. Cl.
| | |
|---|---|
| *F01D 9/04* | (2006.01) |
| *F01D 5/30* | (2006.01) |
| *F01D 5/34* | (2006.01) |
| *B22D 25/02* | (2006.01) |
| *F01D 5/02* | (2006.01) |
| *F01D 5/12* | (2006.01) |
| *F01D 25/24* | (2006.01) |

(Continued)

(52) U.S. Cl.
CPC ........... *F01D 5/3069* (2013.01); *B22D 25/02* (2013.01); *F01D 5/02* (2013.01); *F01D 5/12* (2013.01);
(Continued)

(58) Field of Classification Search
CPC . F01D 5/3069; F01D 5/02; F01D 5/12; F01D 5/3023; F01D 5/3061; F01D 5/34;
(Continued)

(56) References Cited

U.S. PATENT DOCUMENTS 2,877,623 A * 3/1959 Klompas ............... F01D 25/243
415/119
3,403,889 A * 10/1968 Ciokajlo ............... F01D 25/162
415/118

(Continued)

OTHER PUBLICATIONS

Extended European Search Report for European Application No. 14834000.3, dated Jan. 12, 2017.

(Continued)

*Primary Examiner* — Richard Edgar
(74) *Attorney, Agent, or Firm* — Carlson, Gaskey & Olds, P.C.

(57) ABSTRACT

A unitary one-piece hub has first and second rings and a midsection arranged between the first and second rings. The midsection includes a plurality of windows configured to receive a plurality of cross members. The windows include a lip configured to surround the cross members. A gas turbine engine and a method of providing a hub for a gas turbine engine are also disclosed.

17 Claims, 3 Drawing Sheets

(51) Int. Cl.
*F01D 25/30* (2006.01)
*B23P 15/00* (2006.01)

(52) U.S. Cl.
CPC .......... *F01D 5/3023* (2013.01); *F01D 5/3061* (2013.01); *F01D 5/34* (2013.01); *F01D 9/044* (2013.01); *F01D 25/24* (2013.01); *F01D 25/30* (2013.01); *B23P 15/006* (2013.01); *F05D 2220/32* (2013.01); *F05D 2230/21* (2013.01); *F05D 2230/232* (2013.01); *F05D 2230/25* (2013.01); *F05D 2230/60* (2013.01); *F05D 2240/24* (2013.01)

(58) Field of Classification Search
CPC .......... F01D 9/044; F01D 25/24; F01D 25/30; B22D 25/02; B23P 15/006; F05D 2220/32; F05D 2230/21; F05D 2230/232; F05D 2230/25; F05D 2230/60; F05D 2240/24
See application file for complete search history.

(56) References Cited

U.S. PATENT DOCUMENTS

| | | | |
|---|---|---|---|
| 4,479,293 A | 10/1984 | Miller et al. | |
| 4,850,419 A | 7/1989 | Blazek | |
| 4,986,733 A | 1/1991 | Fleury et al. | |
| 5,074,752 A | 12/1991 | Murphy et al. | |
| 5,272,869 A | 12/1993 | Dawson et al. | |
| 5,284,011 A | 2/1994 | Von Benken | |
| 5,494,404 A | 2/1996 | Furseth et al. | |
| 6,547,518 B1 | 4/2003 | Czachor et al. | |
| 6,951,448 B2 | 10/2005 | Duesler et al. | |
| 7,311,495 B2 | 12/2007 | Ashley et al. | |
| 7,765,787 B2 | 8/2010 | Eleftheriou et al. | |
| 7,797,922 B2 | 9/2010 | Eleftheriou et al. | |
| 8,371,812 B2 | 2/2013 | Manteiga et al. | |
| 2006/0026833 A1 | 2/2006 | Imbourg et al. | |
| 2007/0280819 A1 | 12/2007 | Eleftheriou et al. | |
| 2008/0307795 A1 | 12/2008 | Bader et al. | |
| 2010/0040471 A1 | 2/2010 | Izadi | |
| 2010/0132374 A1 | 6/2010 | Manteiga et al. | |
| 2011/0081240 A1* | 4/2011 | Durocher | F01D 9/044 415/209.3 |
| 2012/0121395 A1 | 5/2012 | Marke et al. | |

OTHER PUBLICATIONS

International Preliminary Report on Patentability for International Application No. PCT/US2014/039091 dated Dec. 30, 2015.
International Search Report and Written Opinion for International Application No. PCT/US2014/039091 dated Feb. 17, 2015.

* cited by examiner

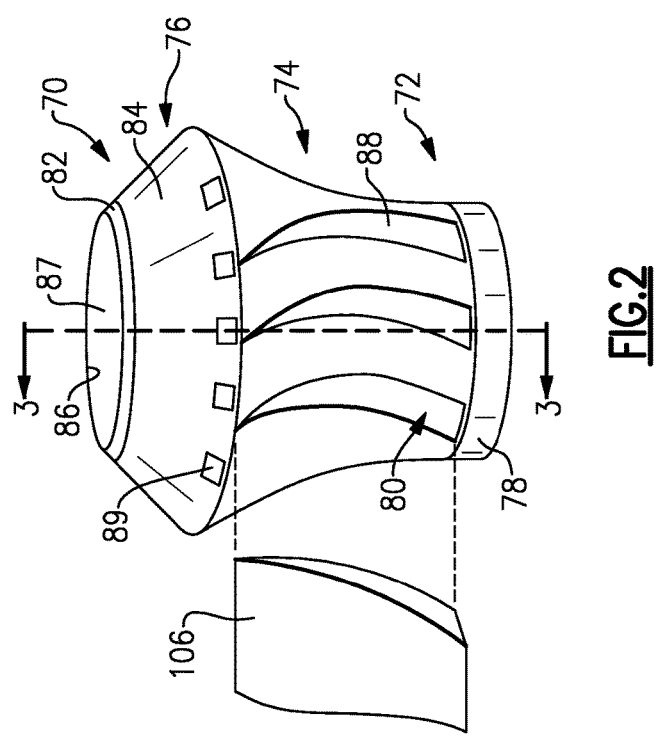
FIG.2
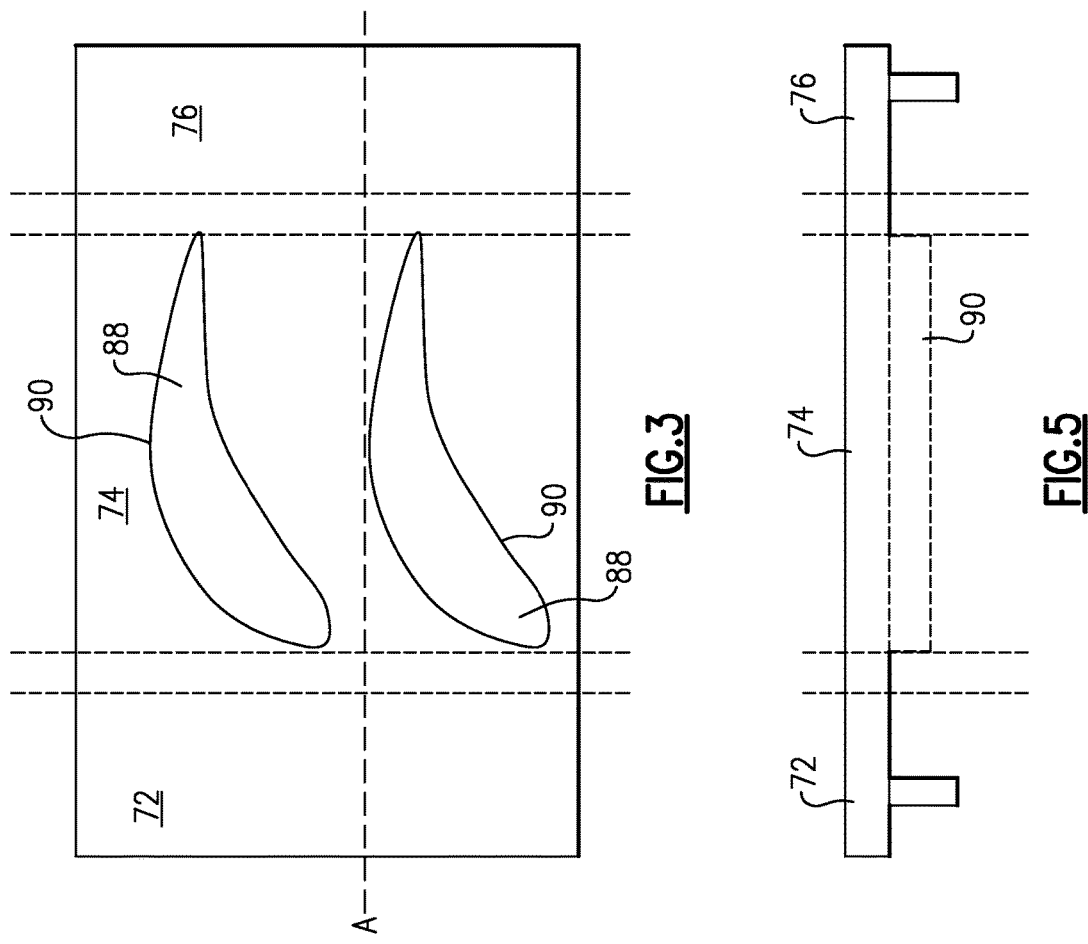
FIG.3
FIG.5

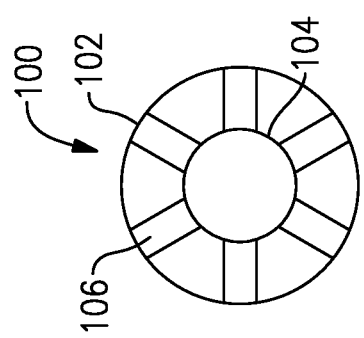
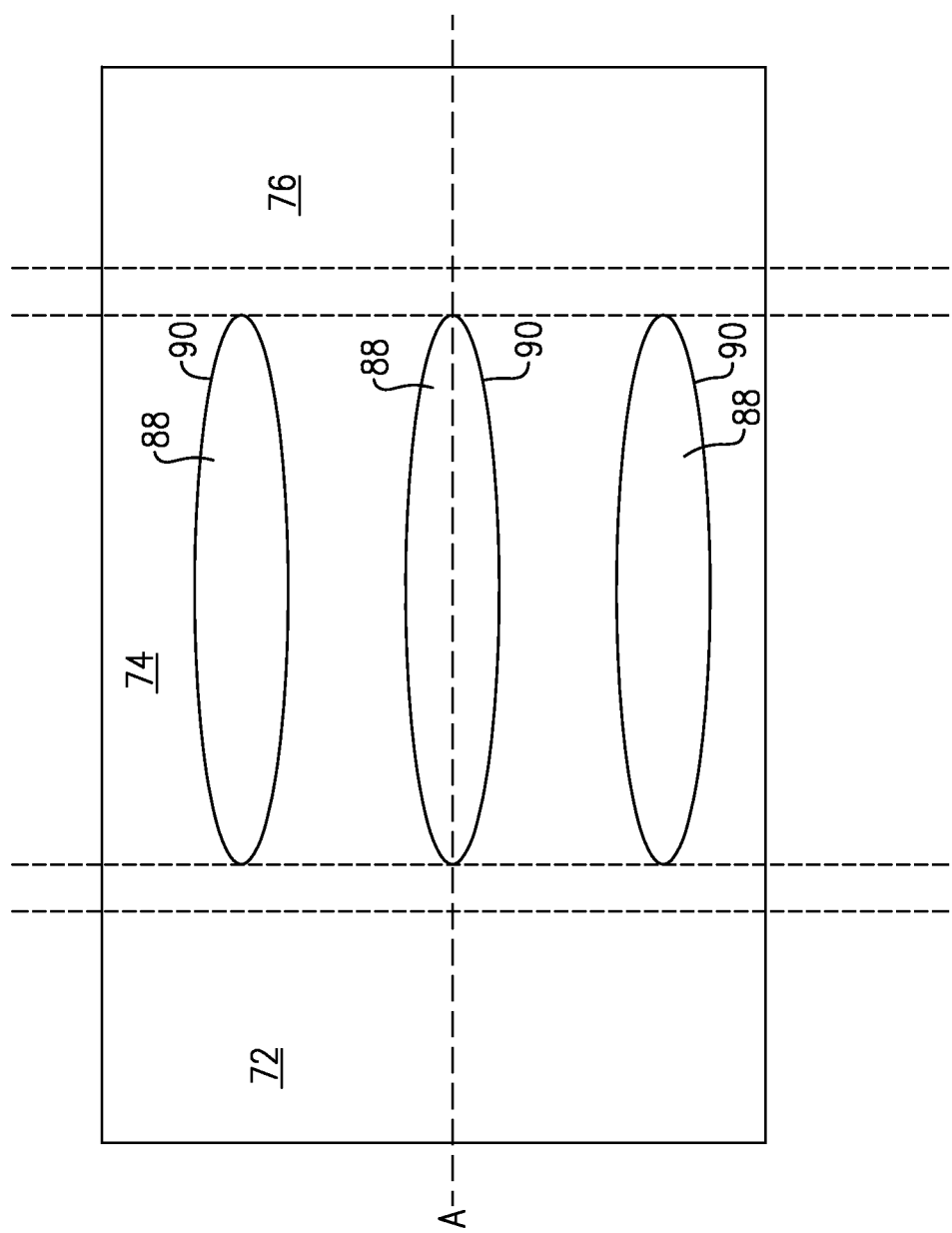

GAS TURBINE HUB

CROSS REFERENCE TO RELATED APPLICATION

This application claims priority to U.S. Provisional Application No. 61/835,871 filed Jun. 17, 2013.

STATEMENT REGARDING FEDERALLY SPONSORED RESEARCH OR DEVELOPMENT

This invention was made with government support under Contract No. N00019-02-C-3003, awarded by the United States Navy. The Government has certain rights in this invention.

BACKGROUND

This disclosure is related to a hub for a gas turbine engine, particularly a one-piece cast or forged hub.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Gas turbine engines may include various hubs such as turbine exhaust cases, mid-turbine frames, transition or intermediate ducts, stator sections, or engine mounts. Hub assemblies may include inner and outer portions with airfoils or struts arranged in between the two portions. Current hubs are typically cast or forged in multiple pieces which then must be assembled, increasing cost and processing time.

Engine manufacturers continue to develop methods to ease engine manufacture and assembly, and improve engine efficiency.

SUMMARY

A unitary one-piece hub according to an exemplary embodiment of this disclosure, among other possible things includes first and second rings and a midsection arranged between the first and second rings. The midsection includes a plurality of windows configured to receive a plurality of cross members, and the windows each include a lip configured to surround the cross members.

In a further embodiment of the foregoing hub, at least one the first and second rings include a stiffening element.

In a further embodiment of any of the foregoing hubs, the stiffening element is located on one of a radially inner surface and a radially outward surface of the first ring.

In a further embodiment of any of the foregoing hubs, the stiffening element is a third ring.

In a further embodiment of any of the foregoing hubs, the plurality of cross members are airfoils.

In a further embodiment of any of the foregoing hubs, the plurality of cross members are struts.

In a further embodiment of any of the foregoing hubs, the plurality of cross members are welded to the lips.

In a further embodiment of any of the foregoing hubs, the lips are disposed on one of a radially inward side and a radially outward side of the midsection.

In a further embodiment of any of the foregoing hubs, the first and second rings and the midsection are cylindrical or conical in shape.

In a further embodiment of any of the foregoing hubs, the hub is formed by a casting process.

In a further embodiment of any of the foregoing hubs, the hub is formed by a forging process.

A gas turbine engine according to an exemplary embodiment of this disclosure, among other possible things includes a turbine, an exhaust arranged downstream from the turbine, and a case surrounding the turbine and exhaust. The case includes an inner case and an outer case wherein at least one of the inner and outer cases includes first and second rings and a midsection arranged between the first and second rings. The midsection includes a plurality of windows configured to receive a plurality of cross members, and the windows each include a lip configured to surround the cross members.

In a further embodiment of the foregoing gas turbine engine, the inner case includes the includes first and second rings and the midsection arranged between the first and second rings, the midsection including the plurality of windows configured to receive the plurality of cross members, and the windows each include a lip configured to surround the cross members.

In a further embodiment of any of the foregoing gas turbine engines, at least one of the first and second rings include a stiffening element.

In a further embodiment of any of the foregoing gas turbine engines, the plurality of cross members are airfoils.

In a further embodiment of any of the foregoing gas turbine engines, the plurality of cross members are welded to the lips.

A method of providing a hub for a gas turbine engine according to an exemplary embodiment of this disclosure, among other possible things includes the step of casting a first hub as one piece, the hub including first and second rings and a midsection arranged between the first and second rings. The midsection includes a plurality of windows configured to receive a plurality of cross members, and the windows each include a plurality of lips, respectively, configured to surround the cross members.

In a further embodiment of the foregoing method of providing a hub for a gas turbine engine, the method further includes the step of attaching the plurality of cross members to the plurality of lips.

In a further embodiment of any of the foregoing methods of providing a hub for a gas turbine engine, the attaching step comprises welding the plurality of cross members to the plurality of lips.

In a further embodiment of any of the foregoing methods of providing a hub for a gas turbine engine, the method further includes the steps of providing a second hub and installing the first hub into the second hub.

BRIEF DESCRIPTION OF THE DRAWINGS

The disclosure can be further understood by reference to the following detailed description when considered in connection with the accompanying drawings wherein:

FIG. 2 schematically illustrates one-piece cast hub.

FIG. 3 schematically illustrates a cutaway view of the hub of FIG. 2.

FIG. 4 schematically illustrates an alternate cutaway view of the hub of FIG. 2.

FIG. 5 schematically illustrates a detail cutaway view of the hub of FIGS. 2-4.

FIG. 6 schematically illustrates a hub assembly.

DETAILED DESCRIPTION

Figure 1:
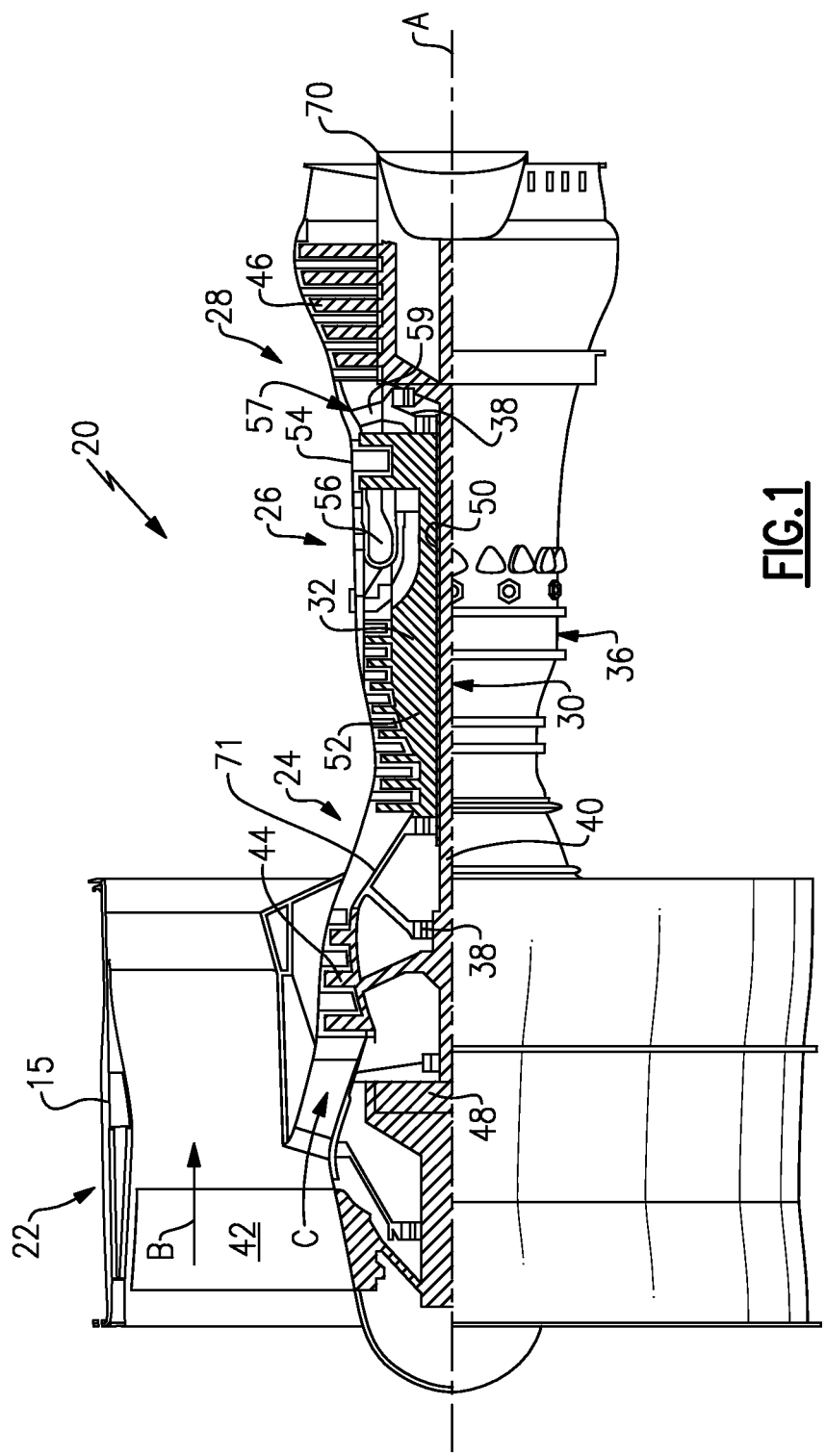
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 (shown schematically) to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow through the core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the previously mentioned expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7]^0.5. The "Low corrected fan tip speed" as disclosed herein according to one non-limiting embodiment is less than about 1150 ft/second.

Referring to FIG. 2, an example hub 70 is schematically shown. The example hub 70 may be axially aligned on an engine axis A. The hub 70 in this example is an inner hub for a turbine 46, 54, however, in another example the hub 70 may be an outer hub for a turbine 46, 54, a mid-turbine frame 57, a transition or intermediate duct 71 within the engine 20, a stator section for the compressor 44, 52 or turbine 46, 54, or an engine 20 mount. In another example, the hub 70 may be incorporated into any static component in the engine 20.

The hub 70 is a one-piece cast or forged structure. The hub 70 includes a forward ring 72 (a first ring), a midsection 74, and an aft ring 76 (a second ring). The forward ring 72 may be cylindrical or conical in shape. One of the radially inner and the radially outer surfaces 78, 80 of the forward ring 72 provides a flowpath for upstream air entering the hub 70. The other of the radially inner and outer surfaces 78, 80 of the forward ring 72 may include structural supports or stiffening elements. In another example, the forward ring 72 may be cantilevered off of the hub 70.

The aft ring 76 is similar to the forward ring 72. One of the radially inner and outer surfaces 84, 86 of the aft ring 76 may include stiffening elements. For example, the stiffening element may be a cast or forged ring 87 on the radially inner side 86 of the aft ring 76. The aft ring 76 may also be cantilevered off of the hub 70. The other of the radially inner and outer surfaces 84, 86 may provide a flowpath for downstream air exiting the hub 70. The aft ring 76 may include one or more flanges 82 for connecting to other parts of the engine 20. The aft ring 76 may also include flanges (not shown) and openings 89. The midsection 74 includes windows 88 to accommodate cross members 106.

Referring to FIGS. 3-4, a schematic cutaway view along the line 3-3 (FIG. 2) of the hub 70 is shown. In the example shown in FIG. 3, the windows 88 are configured to receive cross members 106 such as airfoils (not shown). In the example shown in FIG. 4, the windows are configured to receive cross members 106 such as struts (not shown).

As is shown in FIG. 5, the windows 88 may include a lip 90 extending radially inward from the window 88. The lip 90 allows for attachment of the cross members 106 to the hub 70 by conventional fastening or bonding means. In one example, the cross members 106 may be welded to the lip 90. In another example, the lip 90 may extend radially outward from the hub 70.

FIG. 6 shows a hub assembly 100. The hub assembly 100 may include an outer member 102 and an inner member 104 with the cross members 106 arranged therebetween. One of the inner and outer members 102, 104 may be a hub 70 as described above. That is, if the hub 70 is the inner member 102, the cross members 106 extend radially outward from the hub 70. If the hub 70 is the outer member 104, the cross member 106 extend radially inward from the hub 70.

Accordingly, casting or forging the hub 70 as one piece may provide a hub 70 with enhanced properties, such as improved directional uniformity. Additionally, the potential to employ a near-net casting process allows for limited machining after casting as one piece. A one-piece casting process may provide significant cost saving by eliminating the need for many complex fabrications and assemblies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A unitary one-piece hub comprising:
    first and second rings, the first and second rings each having a radially inner surface, at least one of the first and second rings including a stiffening element on the radially inner surface; and
    a midsection arranged between the first and second rings, the midsection including a plurality of windows configured to receive a plurality of cross members, and the windows each include a lip configured to surround the cross members.

2. The hub as recited in claim 1, wherein the stiffening element is a third ring.

3. The hub as recited in claim 1, wherein the plurality of cross members are airfoils.

4. The hub as recited in claim 1, wherein the plurality of cross members are struts.

5. The hub as recited in claim 1, wherein the plurality of cross members are welded to the lips.

6. The hub as recited in claim 1, wherein the lips are disposed on one of a radially inward side and a radially outward side of the midsection.

7. The hub as recited in claim 1, wherein the first and second rings and the midsection are cylindrical or conical in shape.

8. The hub as recited in claim 1, wherein the hub is formed by a casting process.

9. The hub as recited in claim 1, wherein the hub is formed by a forging process.

10. A gas turbine engine comprising:
    a turbine;
    an exhaust arranged downstream from the turbine; and
    a case surrounding the turbine and exhaust, the case including an inner case and an outer case wherein at least one of the inner and outer cases includes first and second rings and a midsection arranged between the first and second rings, the first and second rings each having a radially inner surface, and at least one of the first and second rings includes a stiffening element on the radially inner surface, the midsection including a plurality of windows configured to receive a plurality of cross members, and the windows each include a lip configured to surround the cross members.

11. The gas turbine engine as recited in claim 10, wherein the inner case includes the includes first and second rings, the first and second rings each having a radially inner surface, and at least one of the first and second rings includes a stiffening element on the radially inner surface, and the midsection arranged between the first and second rings, the midsection including the plurality of windows configured to receive the plurality of cross members, and the windows each include the lip configured to surround the cross members.

12. The gas turbine engine as recited in claim 10, wherein the plurality of cross members are airfoils.

13. The gas turbine engine as recited in claim 10, wherein the plurality of cross members are welded to the lips.

14. A method of providing a hub for a gas turbine engine comprising the steps of:
    casting a first hub as one piece, the hub including first and second rings and a midsection arranged between the first and second rings, the first and second rings each having a radially inner surface, wherein at least one of the first and second rings includes a stiffening element on the radially inner surface, the midsection including a plurality of windows configured to receive a plurality of cross members, and the windows each include a plurality of lips, respectively, configured to surround the cross members.

15. The method as recited in claim 14, further comprising the step of attaching the plurality of cross members to the plurality of lips.

16. The method as recited in claim 15, wherein the attaching step comprises welding the plurality of cross members to the plurality of lips.

17. The method as recited in claim 14, further comprising the steps of providing a second hub and installing the first hub into the second hub.

* * * * *

UNITED STATES PATENT AND TRADEMARK OFFICE
CERTIFICATE OF CORRECTION

PATENT NO. : 9,945,236 B2  
APPLICATION NO. : 14/893229  
DATED : April 17, 2018  
INVENTOR(S) : Steven W. Burd et al.

Page 1 of 1

It is certified that error appears in the above-identified patent and that said Letters Patent is hereby corrected as shown below:

In the Claims

In Claim 11, Column 6, Line 16; replace "includes the includes" with --includes the--

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*